United States Patent [19]

Thoma et al.

[11] 4,450,818

[45] May 29, 1984

[54] HYDRAULIC INJECTION-ADJUSTING DEVICE FOR HIGH PRESSURE INJECTION INSTALLATIONS IN AUTO-IGNITING INTERNAL COMBUSTION ENGINES

[75] Inventors: Frank Thoma; Karl-Heinz Hoffmann, both of Stuttgart; Christoph Burckhardt, Kernen, all of Fed. Rep. of Germany

[73] Assignee: Daimler-Benz Aktiengesellschaft, Fed. Rep. of Germany

[21] Appl. No.: 177,074

[22] Filed: Aug. 11, 1980

[30] Foreign Application Priority Data

Aug. 11, 1979 [DE] Fed. Rep. of Germany ....... 2932672

[51] Int. Cl.[3] ........................ F16D 5/00; F02M 59/20

[52] U.S. Cl. .................................... 123/502; 123/500; 123/357; 464/3; 464/5

[58] Field of Search ............... 123/502, 501, 500, 357, 123/386; 64/25; 464/1, 2, 3, 5

[56] References Cited

U.S. PATENT DOCUMENTS

| | | | |
|---|---|---|---|
| 3,665,907 | 5/1972 | Laufer | 123/502 |
| 3,774,411 | 11/1973 | Phillips | 64/25 |
| 4,019,478 | 4/1977 | Hobo | 123/502 |
| 4,132,202 | 2/1979 | Nakayama | 123/502 |

*Primary Examiner*—Charles J. Myhre

*Assistant Examiner*—Carl Stuart Miller

*Attorney, Agent, or Firm*—Craig & Burns

[57] ABSTRACT

A hydraulic injection-adjusting device for high pressure injection installations in auto-igniting internal combustion engines. Oil is supplied to operating chambers of the injection-adjusting device by means of a pressure supply pump with an electrically actuatable regulating valve being provided for controlling the flow of oil to inlet of the operating chambers. An electronic control unit is supplied on an input side which signals corresponding to current engine operating parameters with the control unit yielding on an output side thereof a desired value for the regulating valve to apply pressure in a controlled fashion to the injection-adjusting device. An arrangement is provided for measuring the actual value of the adjustment angle at the injection-adjusting device by constant answer-back line provides a feed of the actual value to the control unit. A control unit, depending on whether the desired value is larger with respect to the actual value or whether the actual value is larger than the desired value, yields a first and second signal of a defined magnitude. A regulating valve is constructed as an electromagnetically operated three-way or three-position valve for regulation of pressure supply, and pressure relief, with the regulating valve being capable of providing a control function when the valve is in a closed position.

3 Claims, 4 Drawing Figures

FIG 3
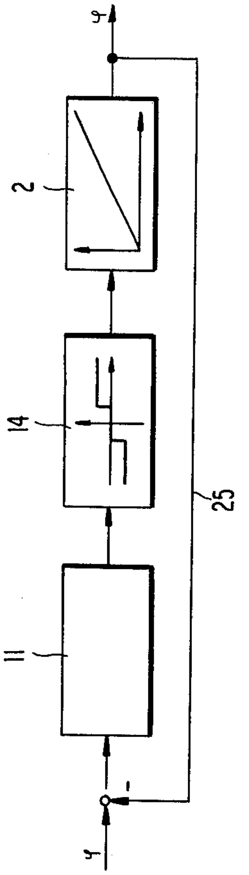
FIG 4
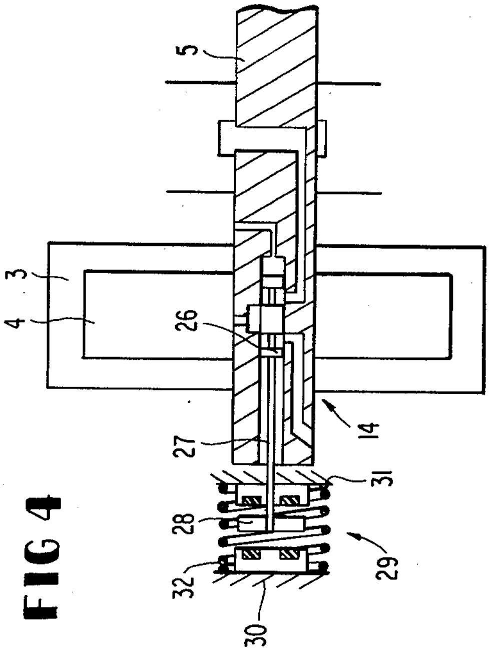
FIG 2
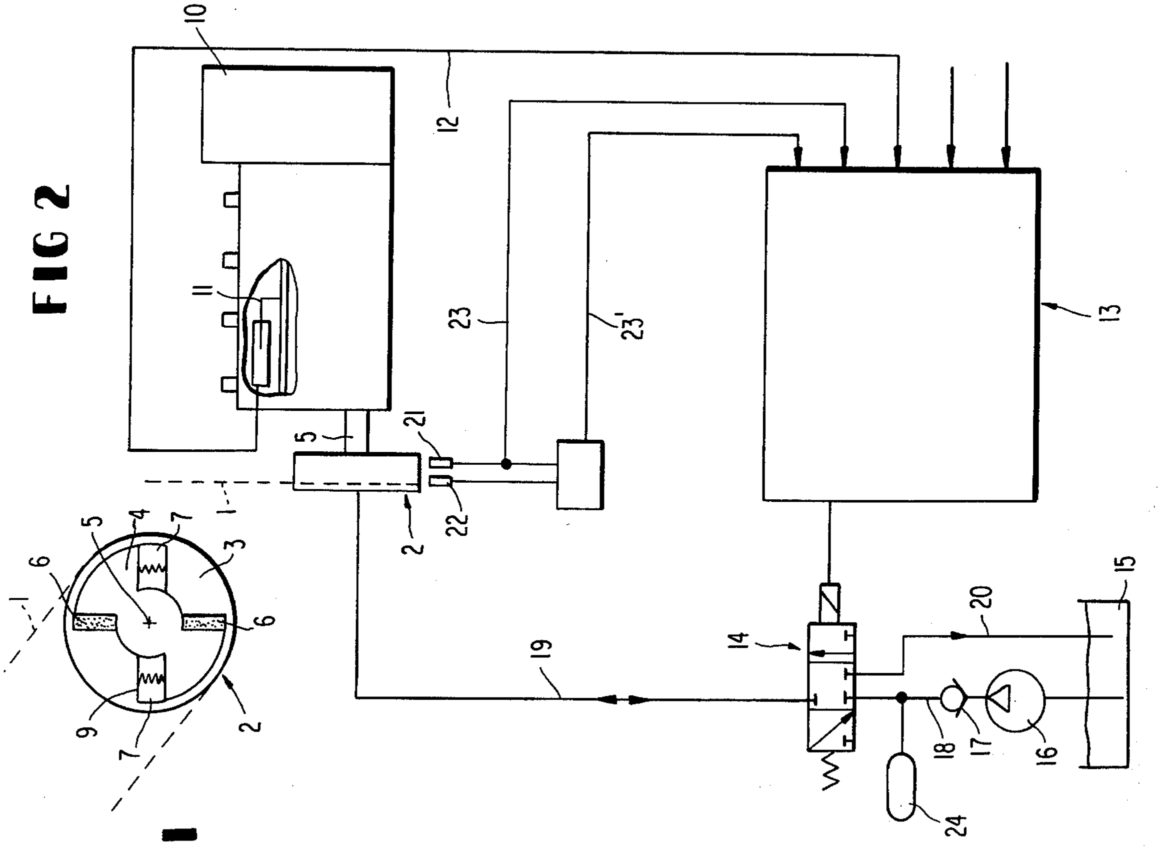
FIG 1

HYDRAULIC INJECTION-ADJUSTING DEVICE FOR HIGH PRESSURE INJECTION INSTALLATIONS IN AUTO-IGNITING INTERNAL COMBUSTION ENGINES

The present invention relates to a hydraulic injection-adjusting device and, more particularly to an injection-adjusting device for high pressure injection installations in auto-igniting internal combustion engines.

In the operation of diesel engines, it is necessary when the fuel is injected directly into the combustion chamber, to vary the instant of injection in dependence upon the speed, the load, and other operating parameters of the diesel engine. The onset of injection is not only of significance for a power output but also concomitantly determining the exhaust characteristics and for a smooth running of the engine. To vary the instant of injection, so-called injection timer units have been proposed which turn the injection pump camshaft with respect to the engine crankshaft. Customarily, the injection timer unit is controlled mechanically by flyweights; however, such control is specifically limited to speed-dependent characteristic curves.

With increased requirements to which diesel engines are subjected, as specially posed with regard to exhaust gas characteristics, it is necessary to make use of an adjustment characteristic which can be shaped at will and can be affected by various operating parameters of the engine.

A hydraulic injection-adjusting or timing device for high pressure injection installations in auto-igniting internal combustion engines has been proposed which includes a pressure oil supply of the operating chambers of the injection-adjusting device by means of a pressure supply pump and an electrically actuatable regulating valve disposed in an inlet to the operating chambers. Additionally, an electronic control unit is supplied on an input side with signals corresponding to current engine operating parameters, with the control unit yielding on an output side thereof a desired value for the regulating valve to apply pressure in a controlled fashion to the injection-adjusting device. A measurement of the actual value of the adjustment angle at the injection-adjusting device is provided and a constant answer-back of the actual value is feed to the control unit.

A fuel injection system is proposed in German Auslegeschrift No. 1,932,600 which operates with a proportional amplification servo member and with a bypass throttle for a pressure medium, with fuel circulation being utilized as the pressure medium and with a spring force of a piston under the effect of the spring being electromagnetically variable in dependence upon the load and in dependupon upon additional operating parameters. As a result of such construction, the pressure in the fuel circulation or supply system is changed, with this change acting on the injection timer unit and adjusting the latter correspondingly. A disadvantage of this proposed system resides in the fact that there is a high throughput or throughflow of the pressure medium through the bypass, a hysteresis effect, and a lower accuracy of the overall control.

Moreover, a torque transmission unit has been proposed wherein an oil stream branched off from the engine oil circulation is utilized for controlling the injection adjustment or injection timer unit.

The aim underlying the present invention essentially resides in providing an injection-adjusting or timing device for high pressure injection installations in a diesel engine which employs a torque transmission means whereby, with a quantitatively minor load on an oil circulation system of the engine, it is possible to introduce, in addition to engine speed, further other different operating parameters in order to impart to an oil stream used for controlling the injection timing means an adjustment characteristic which is adapted to the respective engines.

In accordance with the advantageous features of the present invention, a control unit is provided which, depending on whether a desired value is larger with respect to an actual value of an operating parameter or whether the actual value is larger than a desired value, yields a first and second signal of a defined magnitude. The regulating valve of the present invention is constructed as an electromagnetically operated three-way or three-position valve so as to enable a regulation of two different displacements, distances or paths so as to enable a pressure supply, a pressure relief, and a control effect even in a closed position of a regulating valve.

In accordance with the present invention, the desired value is determined electronically from various operating parameters such as, for example, engine speed, termperature, regulation of the injection pump, adjustment angle of the injection timer, signal from an exhaust gas treatment system, and other variables with the desired value being converted into a corresponding electric signal in a control unit which considers or compares the desired value with the actual value of the operating parameters, and with the electric signal regulating, for example, a piston or valve of the three-way valve accordingly so that the pressure medium may act on the actual injection timer with a predetermined pressure.

In accordance with the present invention, by means of an adjustment of answer-back line and by constant comparison of an actual value with the desired value, the adjusting angle of the injection timer or adjusting device is constantly checked and, if necessary, an electromagnetically operable regulating valve, constructed as a three-way valve, may be controlled in accordance with the measured differences with respect to the pressure supply, pressure relief, or closing position so that the injection timer remains in a given position or an adjustment angle is increased or reduced.

Preferably, the regulating valve may be arranged in a shaft of the injection timer or adjusting device and, a pressure reservoir may be provided between the regulating valve and the pressure supply pump.

The pressure reservoir may be charged during an operation of the internal combustion engine in order to yield the required adjustment pressure during a cold starting, i.e., when the oil pressure is too low. In this connection, the injection timer must be set to an "early" position with a cold start of the engine.

Accordingly, it is an object of the present invention to provide an injection-adjusting device for high pressure injection installations in diesel engines which avoids, by simple means, shortcomings and disadvantages encountered in the prior art.

Another object of the present invention resides in providing an injection-adjusting device for high pressure injection installations in diesel engines which is controlled in response to several different operating parameters of the engine.

Yet another object of the present invention resides in providing an injection-adjusting device for high pressure injection installations in diesel engines which ensures a constant and continuous checking of an adjusting angle of the injection-adjusting device so as to optimize the operation of the diesel engine.

These and other objections, features, and advantages of the present invention will become more apparent from the following description when taken in connection with the accompanying drawings which show, for the purposes of illustration only, one embodiment in accordance with the present invention, and wherein:

FIG. 1 is a schematic view of an injection timer unit in accordance with the present invention;

FIG. 2 is a schematic diagram of the injection timer unit of the present invention installed on a diesel engine;

FIG. 3 is a schematic control circuit diagram of an adjustment answer-back in accordance with the present invention; and FIG. 4 is an enlarged partially schematic cross-sectional view of a hydraulically actuated regulating valve in accordance with the present invention disposed in a shaft of an injection timer unit.

Referring now to the drawings, wherein like reference numerals are used throughout the various views to designate like parts and, more particularly, to FIG. 1, according to this figure, an injection timer unit or injection-adjusting device generally designated by the reference numeral 2, driven by a crankshaft or an engine (not shown) by way of a gear belt 1, includes a housing 3 and a rotary disk or dial part 4 fixedly joined to the injection timer shaft 5. Between the dial part and the housing 3 are respectively oppositely disposed pressure chambers 6 and respectively oppositely located spring chambers 7 which accommodate injection timer springs 8, 9.

As shown in FIG. 2, the injection timer shaft 5 drives a fuel injection pump 10 with a position of a control rod 11 of the injection pump being inductively detected in a conventional manner, with the detected control distance or control position of the control rod 11 being transmitted through a connecting line 12 to a control unit 13 which determines a desired value from the various introduced engine parameters such as, for example, temperature, control distance, speed of the engine, adjusting angle, i.e., adjustment of the injection timer shaft with respect to the crankshaft of the engine, and other parameters. An output signal from the control unit 13 is employed to actuate or control a position of a regulating valve generally designated by the reference numeral 14 which, in the illustrated embodiment, is constructed as a three-way or three-position valve.

A small partial stream of lubricating oil is branched from the lubricating oil circulation system of the engine with the small stream serving as a pressure medium for controlling the injection timer unit 2. The oil is withdrawn from the oil sump 15 and conveyed by means of a pressure supply pump 16. The partial stream of lubricating oil is branched off through a check valve 17 and conducted through a conduit 18 into the regulating valve 14. Depending on a given desired value signal provided to the regulating valve 14 and the corresponding positioning of the valve 14, the injection timer unit is exposed to a pressure through a conduit 19, is blocked when the valve 14 is in the central position, or is opened in the other extreme position so that a pressure relief occurs in the injection timer unit 2 and the pressure oil can be discharged through an oil backflow line 20 into the oil sump 15.

By an inductive measurement at the injection timer unit 2 through conventional inductive sensors, a speed 21 and adjustment angle 22 may be derived and the thus measured or sensed values are then constantly fed to the control unit 13 through the connecting lines 23, 23'. A pressure reservoir 24 for cold starting is provided between the check valve 17 and regulating valve 14. The pressure reservoir 24 is filled up during an operation of the internal combustion engine.

Through the control circuit of the injection timer unit 2 shown in FIG. 3, an actual value $\phi$ is constantly determined from such circuit in dependence upon a respective position of the control rod 11, position of the regulating valve 14, and of the injection timer unit 2 and compared by way of an answer-back line 25 with a desired value $\phi_{des.}$, and the comparison value is utilized as a signal for subsequently controlling the regulating valve 14.

As shown in FIG. 4, the regulating valve 14 may be directly inserted in the injection timer shaft 5 of the injection timer unit 2. A piston 26 of the regulating valve 14 may be connected by connecting rod 27 to an armature 28 of an electromagnet generally designated by the reference numeral 29. The electromagnet 29 has two end positions 30, 31. If the armature 28 is held in the end position 30, a pressure relief takes place in the pressure medium system; whereas, when the armature 28 is held in the end position 31 a feeding of pressure is effected, i.e., the adjustment angle in the injection timer unit is increased. A spring 32 is provided for maintaining the armature 28 in a central position, which is the case if the actual value and the desired value coincide and the given position of the injection timer unit 2 is to be retained.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A hydraulic injection-adjusting device for high-pressure injection installations in autoigniting internal combustion engines, the injection-adjusting device including a plurality of operating chambers adapted to be supplied with a pressure medium, an electrically actuatable regulating valve means for controlling a supply of pressure medium from a pressure supply pump means to the operating chambers, means for sensing a plurality of current operating parameters of the engine and for providing an output signal of the sensed operating parameters, means for measuring an actual value of an adjustment angle of the injection-adjusting device and for providing an output signal of the actual value, and electronic control means for receiving signals from said sensing means and for providing an output signal of a desired adjustment angle of the injection adjusting device to the regulating valve means to control a positioning thereof, characterized in that the control means is operable to yield a first signal of a defined magnitude when the desired adjustment angle is larger than the actual adjustment angle and a second signal when the actual adjustment angle is larger than the desired adjustment angle, said regulating valve means is an electromagnetically operated three-position valve means, said valve means is responsive to the first signal of the control means and is displaced to a first position so as to supply pressure medium to the operating chambers and responsive to the second signal so as to be displaced to a second position so as to relieve the operating chambers of the pressure medium and in that a pressure medium reservoir means is interposed between the regulating valve means and the pressure supply pump means for facilitating a cold-starting of the engine, means for providing for maintaining the regulating valve in a third closed position when the actual value and desired value coincide, the injection-adjusting device further includes a housing directly driven by the crankshaft of the engine, an injection timer shaft adapted to be driven through said injection-adjusting device by the crankshaft of the engine, and a rotary disk means fixedly joined to the injection timer shaft and two operating chambers are disposed oppositely one another between the rotary disk means and the housing, the injection-adjusting device further includes two oppositely disposed spring chamber means within the housing for accommodating injection timer springs, the regulating valve means is disposed in the injection timer shaft.

2. A hydraulic injection device according to claim 1 characterized in that means are provided for providing a constant feeding of the actual value of the adjustment angle to the electronic control means.

3. A hydraulic injection device according to claim 2, characterized in that said last mentioned means is an answer-back line.

* * * * *